April 17, 1934.  A. C. ROWLEY  1,955,685

DRY PIPE VALVE

Filed July 1, 1932  3 Sheets-Sheet 1

Inventor:
Arthur C. Rowley
by his Attorneys
Howson & Howson

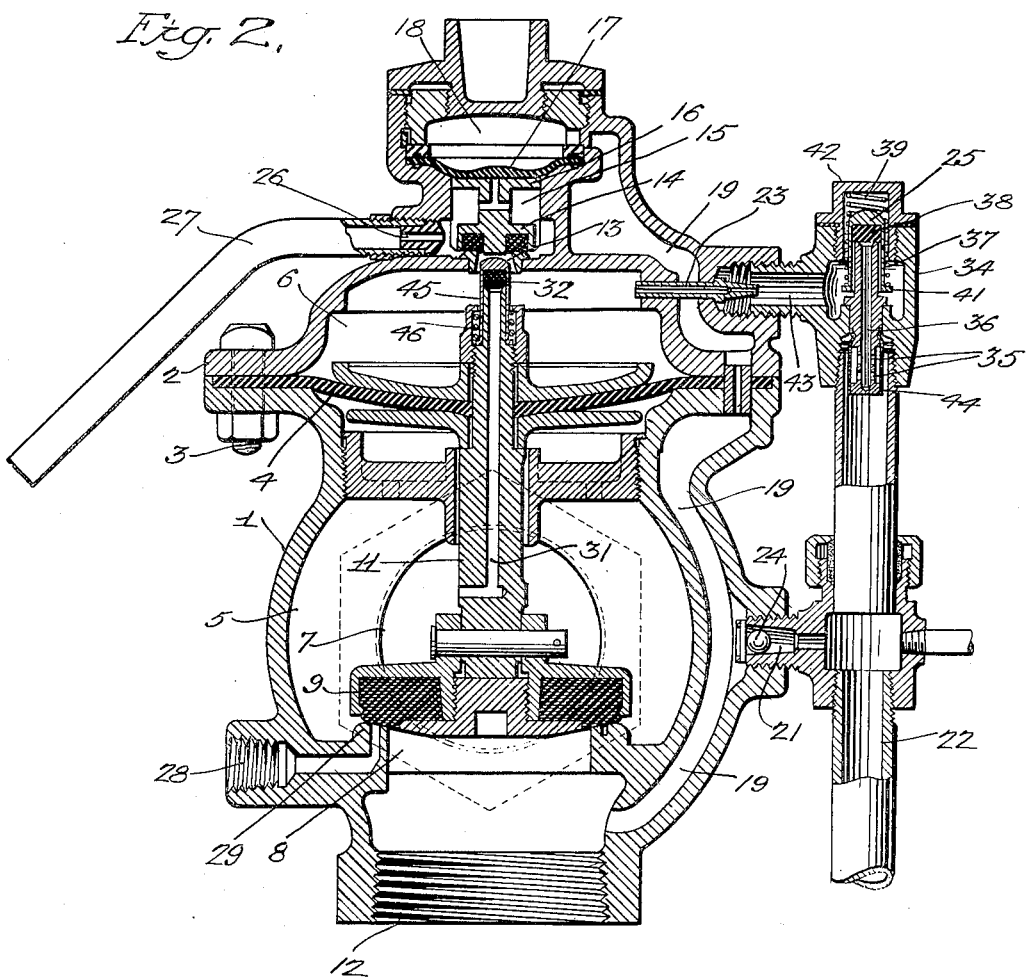

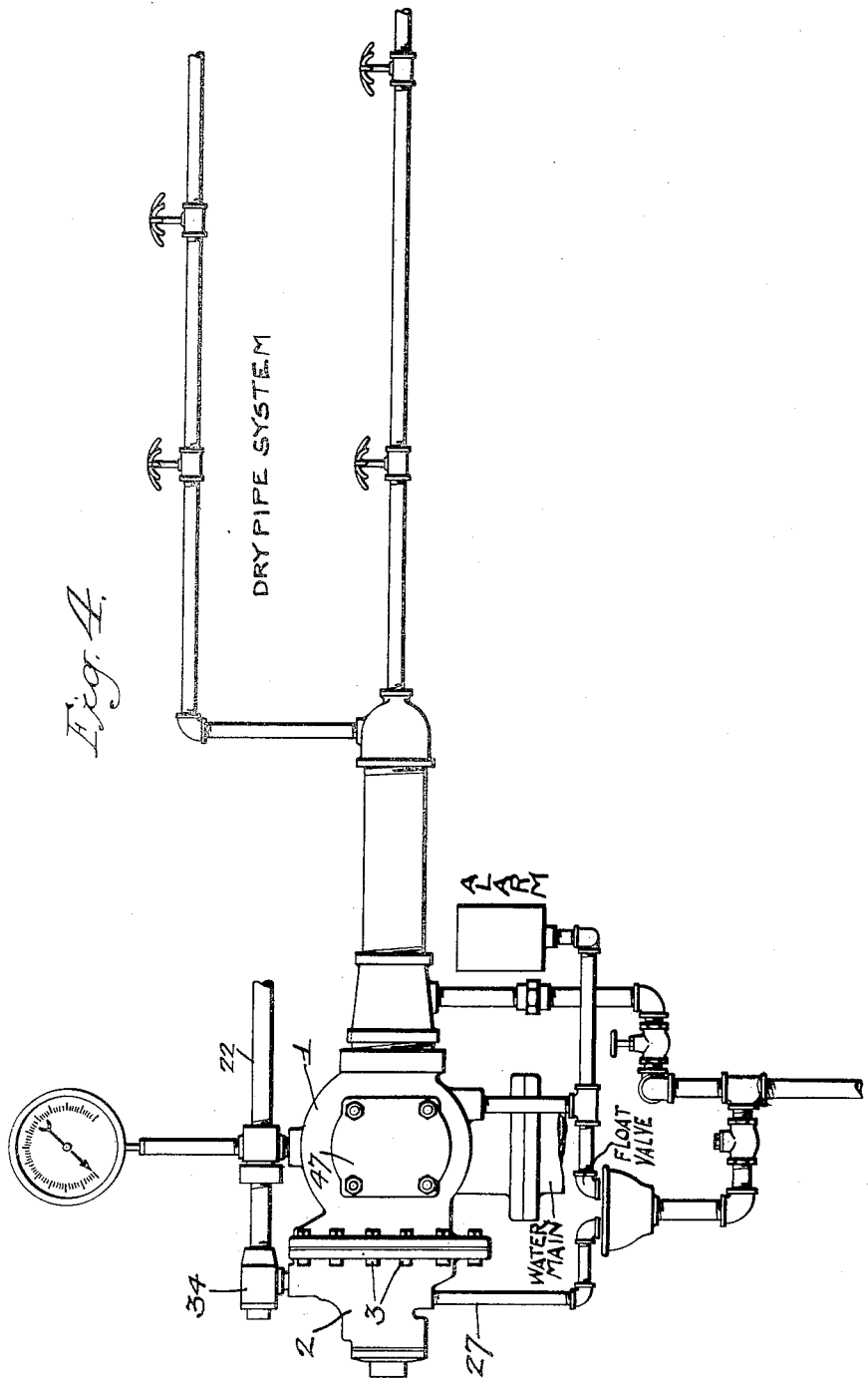

Patented Apr. 17, 1934

1,955,685

UNITED STATES PATENT OFFICE 1,955,685

DRY PIPE VALVE

Arthur C. Rowley, Drexel Hill, Pa., assignor to Globe Automatic Sprinkler Company, Philadelphia, Pa., a corporation of Pennsylvania Application July 1, 1932, Serial No. 620,494

5 Claims. (Cl. 169—20)

This invention relates to new and useful improvements in valves for dry pipe sprinkler systems.

One object of the invention is to provide a valve of the stated character which shall be light in weight, small and relatively inexpensive, said valve being so designed that the cost of maintenance is reduced to a minimum.

Another object of the invention is to provide a valve of the stated character which may be easily reset and wherein provision is made for inspection of the valve seats without removing the air from the dry pipe system to which it may be attached.

Another object of the invention is to provide a valve of the stated character wherein the air pressure in the dry pipe system may be relatively low.

A further object of the invention is to provide a valve of the stated character adapted for use in automatic sprinkler systems in unheated areas, said valve eliminating the need for manually-controlled cold weather valves.

To this general end, another object of the invention is to provide a valve precluding passage of water under normal conditions into the dry pipe system.

A still further object of the invention is to provide means automatically preventing air-resurge effects tending to trip the valve upon admission of the water from the water main during primary setting of the valve.

Another object of the invention is to provide a valve of the stated character wherein tripping tendencies due to fluctuation in the pressure of the water in the valve are avoided.

To this latter end, the invention contemplates the provision in a valve of the stated character of novel means for preventing tripping of the valve due to fluctuations of water pressure.

A still further object of the invention is to provide a valve of the stated character wherein independent opening of the air supply valve does not materially affect the normal operativeness of the valve.

The invention further resides in certain novel structural details and elements hereinafter set forth and illustrated in the attached drawings, in which:

Fig. 2 is a sectional view on the line 2—2, Fig. 1;

Fig. 4 is a diagrammatic view showing the manner of installing the valve in the system.

Figure 1:
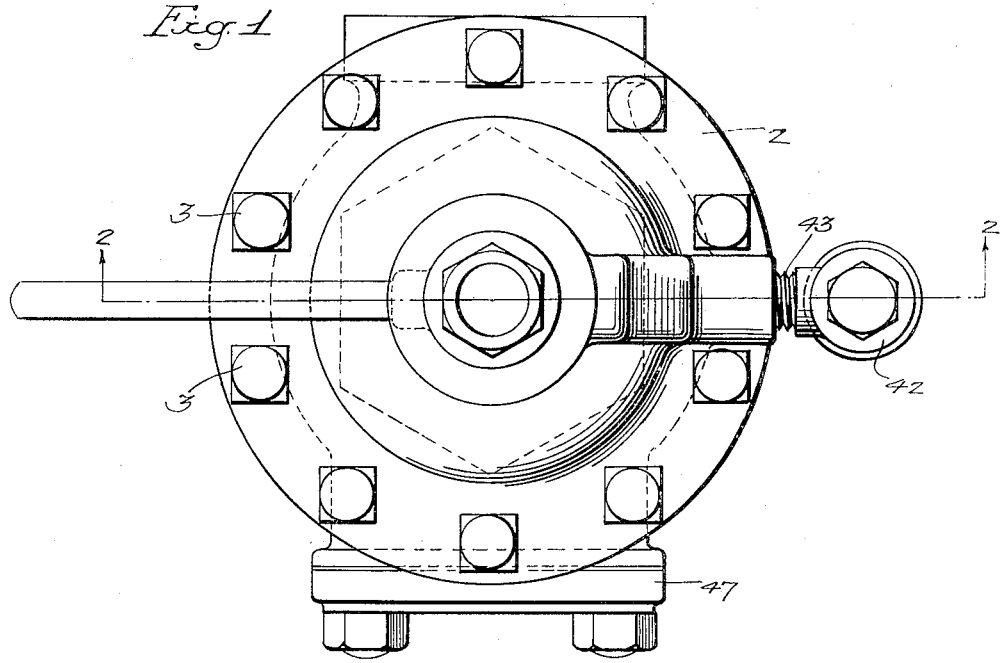
Figure 1 is a top plan view of a valve made in accordance with my invention.

With reference to the drawings, a valve made in accordance with my invention comprises a casing 1, said casing comprising a cover-member 2 secured to the body of the casing by bolts 3, there being clamped between the cover-member and the body of the casing a diaphragm 4 which divides the interior of the casing into chambers 5 and 6. The chamber 5 has an inlet port 7 and a discharge port 8, which latter is normally closed by a valve 9, this valve being connected through a stem 11 with the diaphragm 4. The casing has a discharge port 12 communicating with the port 8 of the chamber 5.

The chamber 6 has an outlet port 13 which is normally closed by a valve 14, this valve being positioned in a chamber 15 in the casing cover-member 2 and having a cylindrical portion 16 slidably fitting the cylindrical walls of the chamber 15 and abutting one side of a flexible diaphragm 17 clamped in the upper end of the cover-member 2. A space or chamber 18 is provided at the opposite side of the diaphragm 17, and this space communicates through a channel 19 formed in the wall of the casing 1 with the discharge port 12 as clearly illustrated in Fig. 2. The passage 19 communicates through a port 21 with an air supply pipe 22, this pipe also communicating through a duct 23 with the casing chamber 6. The port 21 is controlled by a ball check valve 24, while the connection between the air supply pipe 22 and the chamber 6 is controlled by a check valve 25, the details of which will be hereinafter described. The chamber 15 is connected through a port 26 with a drain pipe 27; and a port 28 in the casing 1 terminates in the seat 29 for the valve 9 and is normally closed by said valve as the latter bears upon this seat. Communication between the chambers 5 and 6 is also provided for through the medium of a passage 31 extending longitudinally through the stem 11 of the valve 9, the terminal end of this passage in the chamber 6 being controlled by a spring-pressed check valve 32.

When properly installed, the casing port 7 is in communication with the water main and the port 12 with the dry pipe sprinkler system. As previously set forth, the pipe 22 connects with a suitable source of air supply. The port 28 is provided for connection with a suitable alarm. In setting the device, water is excluded from the port 7 through the medium of a suitable valve in the water main and air is admitted through the pipe 22, this air passing into the dry pipe system through the port 22 and passage 19, and the air also entering the chamber 18 through the said passage 19. Air is also admitted past the check valve 25 and through the duct 23 to the chamber 6. Since the area of the diaphragm 17 is greater than the effective area of the valve 14 exposed through the port 13, this valve is retained on its seat, closing the last-named port. Similarly, the air pressure in the chamber 6 acting upon the diaphragm 4 is sufficient to retain the valve 9 to its seat against the pressure of the air in the dry pipe system, this by reason of the relatively greater effective area of the said diaphragm as compared with the area of the valve 9 exposed to the air pressure in the system through the port 8. When the air pressure is balanced in the chambers 18, 6 and in the dry pipe system connecting with the port 12 and has reached the predetermined magnitude, the air supply pipe 22 may be closed through the medium of a suitable valve (not shown) and the water from the main admitted to the chamber 7, the system then being in operative condition.

Subsequent release of air pressure from the dry pipe system by the opening of one or more of the sprinkler heads associated therewith immediately effects a corresponding reduction of pressure in the chamber 18, whereupon the pressure in the chamber 6 is permitted to elevate the valve 14 from its seat, which results in an exhaust of pressure from the chamber 6 through the drain pipe 27. Relief of the pressure in the chamber 6 permits the water pressure in the chamber 5 operating upon the relatively large area of the diaphragm 4 to elevate the valve 9 from its seat, thereby connecting the dry pipe system with the water main. Water entering the passage 19 is excluded from the the air supply pipe 22 by the ball check 24, which prevents leakage of water through the port 21 and the pipe 22 to the chamber 6, and from the chamber to the drain 27. Elevation of the valve 9 also admits water to the port 28 and to the alarm connected therewith. Water pressure entering the chamber 18 through the passage 19 is insufficient to reclose the valve 14 against the greater pressure of the water in the chamber 5 acting against the larger diaphragm 4, it being noted that the valve stem 11 is extended in the chamber 6 to a point closely adjacent the underside of the valve 14, and this extension when the valve 9 and its stem are elevated, as previously described, constituting a stop preventing return of the valve 14 to its seat. Water will thus continue to flow to the dry pipe system and to the sprinklers associated therewith until such time as the water main control valve (not shown) is closed. Subsequent readmission of air to the valve through the pipe 22 and as previously described results in a reseating of the valves 9 and 14 and a return of the various elements to the relative positions shown in Fig. 2.

Figure 3:
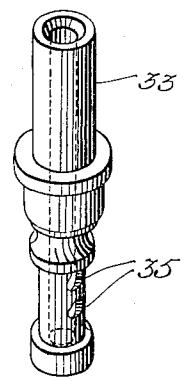
Fig. 3 is an enlarged detached perspective view of the automatic check valve constituting an element of the device.

The details of the valve 25 are illustrated in Figs. 2 and 3. The valve comprises a tubular body member 33, see Fig. 3, which is supported in the fitting 34. One end of the body member 33 projects into the pipe 22 and is provided at the sides with ports 35 affording access to the interior longitudinal passage 36 of said body. At the opposite end, the body member is provided with a cap member 37 having a rubber or other suitable washer 38 which normally rests upon the end of the body member and closes the terminal end of the interior passage 36. The cap member 37 is held resiliently against the end of the body member by a spring 39 which is confined between the flange 41 of the cap member and the detachable closure member 42 of the fitting 34. This fitting has a discharge port 43 which extends through a threaded boss through the medium of which the fitting is attached to the casing 1. The duct 23 which communicates with the port 43 is mounted in the casing and in the present instance extends through the passage 19 of the latter and into the casing chamber 6. That end of the body member 33 which projects into the pipe 22 is provided with a cylindrical screen 44 which excludes foreign matter from the interior of the valve. It will be apparent that this valve permits flow of air from the pipe 22 into the chamber 6 but prevents a reverse flow.

The valve member 32 is similar in form to the cap 37 of the valve 25 described above. The sleeve 45 of the valve 32 is normally held down against the terminal end of the stem 11 by means of a spring 46. This valve thereby prevents escape of pressure from the chamber 6 through the passage 31 of the stem.

It will be noted that when the system has been charged with air and the water admitted to the valve, the water is permitted to permeate the chamber 6 through the passage 31, sufficient water entering the said chamber to equalize the pressures at opposite sides of the diaphragm 4. The valve is thereby kept closed substantially entirely by the water pressure, the only requirement as to air pressure in the system being that it shall be sufficient, acting upon the relatively large diaphragm 17, to hold the valve 14 seated against the pressure in the chamber 6. The air pressure in the system may, therefore, be relatively low. Tripping of the valve is effected upon release of air from the system through the medium of the auxiliary valve 14.

It will be apparent that when the valve has been charged with air as previously set forth and the valve controlling the water main is open to admit water to the chamber 5 of the valve, the automatic check valve 25 described above prevents resurge of air from the chamber 6, and thereby overcomes any tendency of the water entering the chamber 5 to unseat the valve. Also should there be any fluctuation of the water pressure or reduction in the water pressure within the chamber 5 below the air pressure in the system, the automatic check valve 25 permits the system air to enter the chamber 6 to hold the valve closed against any tripping tendency. The ball check 24 remains normally open to permit this passage of air from the system to the chamber 6, but as previously set forth, this ball check 24 will be closed immediately by any water tending to pass from the passage 19 through the port 21 into the pipe 22. This ball check 24 further acts as a safety means in the event that the pipe 22 after the charging of the valve and system is inadvertently left connected with the source of air pressure. The port 21 with the ball check 24 is so restricted that in the event of a sprinkler in the dry pipe system opening under these conditions, the air from the pipe 22 cannot enter the passage 19 and the system sufficiently fast to maintain the pressure in the system and in the chamber 18 required to prevent opening of the valve 9 as previously described. The valve accordingly will be operative regardless of whether the pipe 22 is connected with the source of air supply or, as normally would be the case, is disconnected therefrom through the medium of a suitable valve.

The valve forming the subject of this invention has the desirable characteristics of compactness, lightness of weight, and relatively low manufacturing cost. Maintenance of the valve is relatively low, and the assembly is such that inspection of the valve element 9 may be readily made by removal of the cover plate 47 of the casing 1 without removing the air from the dry pipe system and by merely closing the water main to prevent influx of water to the valve chamber 5 through the port 7. The valve by reason of its operating characteristics as described above precludes possibility of water seeping into the dry pipe system under all normal conditions, and thereby may be safely employed for controlling sprinkler systems in areas subject to sub-freezing temperatures. The valve avoids the necessity for disconnecting the system in such areas during periods of sub-freezing temperature, and maintains the fire protection continuously.

It will be apparent that there may be modifications in structural details without departure from the invention.

I claim:

1. In a valve for dry pipe sprinkler systems, a casing comprising a water chamber and main and supplemental pressure chambers, intake and discharge ports for said water chamber adapted respectively for connection to a water main and to said system, a valve in said water chamber normally closing the discharge port from inside the chamber, a flexible diaphragm forming a dividing wall between said water and main pressure chambers and operatively connected with said valve, a check valve-controlled passage between the water and main pressure chambers constructed and arranged to permit restricted pressure flow from the water to the pressure chamber, a discharge port for said main pressure chamber of greater capacity than the passage between the water chamber and the main pressure chamber, a valve normally closing said discharge port against the pressure in said chamber, a flexible diaphragm forming a wall of said supplemental pressure chamber and operatively associated with the valve last named to hold the valve closed by pressure in the supplemental chamber, said diaphragms being of greater effective areas than the respective valves with which they are associated, means connecting the supplemental chamber with the water chamber discharge port at a point externally of the water chamber, an air supply duct, independent means for connecting said duct with the supplemental and main pressure chambers, a normally open check valve controlling the connecting means between said air supply duct and the supplemental pressure chamber, said valve being constructed and arranged to permit passage of air between said supplemental chamber and the air supply duct but preventing flow of water into the air duct, and a second normally closed check valve constructed and arranged to permit pressure flow through said connecting means from the air duct to the main pressure chamber while preventing a pressure flow in the reverse direction.

2. In a valve for dry pipe sprinkler systems, a casing comprising a water chamber and main and supplemental pressure chambers, intake and discharge ports for said water chamber adapted respectively for connection to a water main and to said system, a valve in said water chamber normally closing the discharge port from the inside of the chamber, a flexible diaphragm forming a dividing wall between said water and main pressure chambers and operatively connected with said valve, a check valve controlled-passage between the water and main pressure chambers constructed and arranged to permit restricted pressure flow from the water to the pressure chamber, a discharge port for said main pressure chamber, said port being of greater capacity than the passage between the water and main pressure chambers, a valve normally closing said discharge port against the pressure in said chamber, a flexible diaphragm forming a wall of said supplemental pressure chamber and operatively associated with the valve last named to hold the valve closed by pressure in the supplemental chamber, said diaphragms being of greater effective areas than the respective valves with which they are associated, means connecting the supplemental chamber with the water chamber discharge port at a point externally of said water chamber, an air supply duct, independent means for connecting said duct with the supplemental and main pressure chambers, a normally closed check valve controlling the connection between the said duct and the main pressure chamber, said check valve being constructed and arranged to permit pressure flow from the duct to the chamber while preventing a pressure flow in the reverse direction, and a normally open check valve controlling the connection between said air supply duct and the supplemental pressure duct, the last-named check valve being constructed and arranged to permit passage of air in either direction through said connection but preventing passage of water through said connection to the air duct.

3. In a valve for dry pipe sprinkler systems, a casing comprising a water chamber and main and supplemental pressure chambers, intake and discharge ports for said water chamber adapted for connection respectively to a water main and to said system, a valve in said water chamber normally closing the discharge port from the inside of the chamber, a flexible diaphragm forming a dividing wall between said water and main pressure chambers and operatively connected with said valve, a passage between said water and main pressure chambers, a check valve constructed and arranged to permit flow of water through said passage from the water chamber to the main pressure chamber while preventing a reverse flow, means connecting the supplemental pressure chamber with said system, a discharge port for said main pressure chamber, said discharge port being of greater capacity than the passage between the water and main pressure chambers, a valve normally closing said discharge port against pressure within said main pressure chamber, a flexible diaphragm forming a wall of said supplemental chamber and operatively associated with the last-named valve to hold the valve closed by pressure in the supplemental chamber, said diaphragms being of greater effective area than the valves with which they are respectively associated, a passage connecting the said system with the main pressure chamber, a check valve in said passage constructed and arranged to permit pressure flow through said passage to the main pressure chamber but preventing a reverse flow, a second check valve in said passage constructed and arranged to permit flow of air between the system and said passage in either direction but operative to prevent flow of water from the system into said passage, and air supply means connected with said passage intermediate the said check valves.

4. In a valve for dry pipe sprinkler systems, a casing comprising a water chamber and main and supplemental pressure chambers, intake and discharge ports for said water chamber adapted for connection respectively to a water main and to said system, a valve in said water chamber normally closing the discharge port from the inside of the chamber, a flexible diaphragm forming a dividing wall between said water and main pressure chambers, a stem operatively connecting said valve with the diaphragm, said stem projecting into said pressure chamber, a discharge port for said main pressure chamber positioned in alignment with said valve stem and through which the terminal end of said stem is adapted to project when said water valve is unseated, a valve normally closing said pressure chamber discharge port against pressure within said chamber, a flexible diaphragm forming a wall of said supplemental chamber and operatively associated with the last-named valve to hold the valve closed by pressure in the supplemental chamber, said diaphragms being of greater effective areas than the valves with which they are respectively associated, a passage in said valve stem affording communication between the water chamber and the main pressure chamber, said passage being of lesser capacity than the discharge port of said main pressure chamber, a check valve constructed and arranged to permit pressure flow through said passage from the water chamber to said main pressure chamber but preventing a reverse flow, a passage affording communication between the supplemental chamber and the dry pipe system, a duct connecting said passage with the main pressure chamber, a check valve in said duct constructed and arranged to permit flow therethrough to the main pressure chamber while preventing a reverse flow, a second check valve in said duct constructed and arranged to permit flow of air between said duct and the passage in either direction but preventing flow of water from said passage to the duct, and air supply means connected with said duct intermediate said check valves.

5. In a dry pipe sprinkler system, a valve comprising a water chamber and main and supplemental pressure chambers, intake and discharge ports for said water chamber adapted for connection respectively to a water main and to said system, a valve in said water chamber normally closing the discharge port from the inside of the chamber, a flexible diaphragm forming a dividing wall between said water and main pressure chambers and operatively connected with said valve, a check valve-controlled passage admitting water pressure of the main to the main pressure chamber, a discharge port for said main pressure chamber, said port being of greater capacity than the said passage, a valve normally closing said port against the pressure within the said main pressure chamber, a flexible diaphragm forming a wall of said supplemental chamber and operatively associated with the valve last named to hold the valve closed by pressure in the supplemental chamber, said diaphragms being of greater effective areas than the valves with which they are respectively associated, means for connecting the said system with the main and supplemental pressure chambers, and check valve means controlling the connection between the system and the main pressure chamber and constructed and arranged to permit flow to said chamber through said connection while preventing a reverse flow, a check valve constructed and arranged to permit flow of air from the system to said main pressure chamber while preventing a reverse flow and for preventing flow of water from the system to the main pressure chamber, and means for supplying air to said system.

ARTHUR C. ROWLEY.